US010481577B2

(12) United States Patent
Forrest et al.

(10) Patent No.: US 10,481,577 B2
(45) Date of Patent: Nov. 19, 2019

(54) SYSTEM AND METHOD FOR OBJECT DISTANCE DETECTION AND POSITIONING (71) Applicant: GM GLOBAL TECHNOLOGY OPERATIONS LLC, Detroit, MI (US)

(72) Inventors: John Forrest, Grosse Pointe Woods, MI (US); Joshua Solomon, Southfield, MI (US); Michael Poss, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 15/440,616

(22) Filed: Feb. 23, 2017

(65) Prior Publication Data

US 2018/0239331 A1  Aug. 23, 2018

(51) Int. Cl.
*G05B 19/402* (2006.01)
*B23K 26/03* (2006.01)
(Continued)

(52) U.S. Cl.
CPC .......... *G05B 19/402* (2013.01); *B23K 1/0056* (2013.01); *B23K 26/032* (2013.01);
(Continued)

(58) Field of Classification Search
CPC ............ H04N 5/23212; H04N 13/128; H04N 2101/00; H04N 5/23216; H04N 5/23219; H04N 5/23248; H04N 5/225; H04N 5/2259; H04N 5/2354; H04N 5/2256; G06T 7/571; G06T 2207/10016; G06T 5/006; G02B 7/04; G02B 27/0012; G02B 7/38; G02B 7/36; G02B 27/0025; G02B 27/0068; G02B 5/208; G02B 7/102; G02B 21/244; G02B 7/32; G02B 21/0004; G02B 21/02; G02B 21/025; G02B 21/367; G02B 21/368; G02B 3/14; G03B 13/36; G03B 17/18; G03B 13/32; G03B 13/34; G03B 15/05; G03B 2215/05; G03B 7/16; A61B 3/0058; A61B 3/024; A61B 3/107; A61B 1/00188; A61B 1/05; G02C 13/005; G06F 19/00; G06K 9/00228; G06K 9/00597; B23K 26/048; G01S 17/46; G05B 19/402;
(Continued)

(56) References Cited

U.S. PATENT DOCUMENTS

4,511,248 A  *  4/1985  Abbas ..................... G01S 17/32
                                                          356/4.07
4,967,280 A  *  10/1990  Takuma ............. H04N 5/23212
                                                          250/201.2
(Continued)

*Primary Examiner* — Aklilu K Woldemariam (57) ABSTRACT

A method for object distance detection and focal positioning in relation thereto. The method comprising the steps of: (a) identifying (via a computing device) a desired distance among a plurality of designated sites on an object; (b) adjusting a focus (via an autofocus device) onto the plurality of designated sites; (c) calculating (via an image recognition module) the actual distance among the plurality of designated sites; (d) determining (via the image recognition module) if error exist between the actual distance and the desired distance; and (e) wherein (in no particular order) repeating the steps of (b), (c), and (d) until no substantial error exists between the actual distance and the desired distance.

16 Claims, 4 Drawing Sheets (51) Int. Cl.
*B23K 26/04* (2014.01)
*G05B 19/18* (2006.01)
*B23K 1/005* (2006.01)
*B23K 26/14* (2014.01)
*B23K 101/00* (2006.01)

(52) U.S. Cl.
CPC ........ *B23K 26/048* (2013.01); *B23K 26/1464* (2013.01); *G05B 19/182* (2013.01); *B23K 2101/006* (2018.08); *G05B 2219/36414* (2013.01); *G05B 2219/45138* (2013.01)

(58) Field of Classification Search
CPC .. G05B 2219/36414; G01N 2001/2893; Y10S 128/922; G02F 1/29
USPC ........... 382/106; 348/241, 345, 349; 396/52, 396/125
See application file for complete search history.

(56) References Cited

U.S. PATENT DOCUMENTS

| | | | | |
|---|---|---|---|---|
| 4,988,856 | A * | 1/1991 | Hamada | G02B 7/36 250/201.8 |
| 8,233,078 | B2 * | 7/2012 | Chang | H04N 5/23219 250/201.4 |
| 2001/0004399 | A1 * | 6/2001 | Nonaka | G01C 3/10 382/106 |
| 2002/0090127 | A1 * | 7/2002 | Wetzel | G01B 7/003 382/133 |
| 2004/0036795 | A1 * | 2/2004 | Fujii | H04N 5/23212 348/349 |
| 2005/0174584 | A1 * | 8/2005 | Chalmers | G01B 11/0625 356/630 |
| 2007/0122129 | A1 * | 5/2007 | Sakamoto | H04N 5/23212 396/52 |
| 2008/0002960 | A1 * | 1/2008 | Ito | G03B 13/36 396/125 |
| 2008/0043136 | A1 * | 2/2008 | Yamazaki | G03B 3/00 348/345 |
| 2008/0252773 | A1 * | 10/2008 | Oishi | G03B 13/32 348/347 |
| 2010/0053417 | A1 * | 3/2010 | Baxansky | H04N 5/23212 348/345 |
| 2011/0032411 | A1 * | 2/2011 | Hirai | G02B 7/36 348/345 |
| 2011/0317988 | A1 * | 12/2011 | Lee | G03B 7/16 396/61 |
| 2013/0182152 | A1 * | 7/2013 | Li | G02B 7/38 348/241 |
| 2014/0009634 | A1 * | 1/2014 | Hiwada | H04N 5/225 348/222.1 |
| 2015/0085176 | A1 * | 3/2015 | Shchepetov | H04N 5/23212 348/345 |
| 2015/0189154 | A1 * | 7/2015 | Laroia | H04N 5/23212 348/345 |
| 2016/0080634 | A1 * | 3/2016 | Hamano | G02B 7/365 348/349 |
| 2016/0295098 | A1 * | 10/2016 | Li | G06T 7/571 |
| 2016/0317025 | A1 * | 11/2016 | Lee | A61B 3/032 |
| 2017/0048459 | A1 * | 2/2017 | Masuda | G01C 3/06 |
| 2017/0299900 | A1 * | 10/2017 | Montoya | G02F 1/0115 |
| 2018/0046062 | A1 * | 2/2018 | Fisher | G08C 17/02 |

* cited by examiner

SYSTEM AND METHOD FOR OBJECT DISTANCE DETECTION AND POSITIONING

Laser brazing and welding processes have been conventionally used to join two metal members such as automobile sheet metal. One way to accomplish this task, a brazing-welding machine implements a laser to melt a wire feed at the seam nestled between both metal members. However, the wire feed is required to be accurately positioned onto the metal members or the brazing quality drastically suffers or, worse, damage to the brazing-welding machine will occur. Moreover, tuning the brazing-welding machine to be accurately positioned over the metal members can be time consuming for the machine operator as well as require their use of complex equipment. It is therefore desirable to provide a system and method which reduces the tune-in time as well as increases accuracy for these brazing and welding operations.

SUMMARY

A method for object distance detection and focal positioning in relation thereto. The method including the steps of: (a) identifying (via a computing device) a desired distance among a plurality of designated sites on an object; (b) adjusting a focus (via an autofocus device) onto the plurality of designated sites; (c) calculating (via an image recognition module) the actual distance among the plurality of designated sites; (d) determining (via the image recognition module) if error exist between the actual distance and the desired distance; and (e) wherein (in no particular order) repeating the steps of (b), (c), and (d) until no substantial error exists between the actual distance and the desired distance.

In one or more instances, the method may further include: (f) providing the existing error value to a feedback control loop; and (g) producing (via the feedback control loop) a focus correction value. In one or more instances, the method may further include an industrial robot acting as a pass through system between the computing device and the brazing-welding device. The feedback control loop may be a PID controller located in the computing device. The autofocus device may be located in a brazing-welding device. The image recognition module may be located in the computing device.

A system to detect the distance of an object and position a laser head in relation thereto is further presented herein. The system includes a computing device, image recognition module, and an autofocus device. The computing device is configured to establish a desired distance among a plurality of designated sites on the object. The image recognition module is configured to calculate the actual distance among the plurality of designated sites and to determine if error exists between the actual distance and desired distance of the plurality of designated sites. The autofocus device is configured to adjustmentally focus onto the plurality of designated sites. Moreover, the autofocus device will adjust the focus when error is determined to exist between the actual distance and desired distance of the plurality of designated sites.

A method for detecting the distance among a plurality of designated sites on an object and positioning an autofocus device in relation to those designated sites is further presented herein. The method includes the steps of: (a) identifying (via a computing device) a desired distance among the plurality of designated sites on an object; (b) adjusting a focus (via an autofocus device of a brazing-welding device) to a distance which can monitor the plurality of designated sites; (c) calculating (via an image recognition module) the actual distance among the plurality of designated sites; (d) calculating (via the image recognition module) an error value which corresponds to a discrepancy between the actual distance and the desired distance; (e) calculating (via a feedback control loop) a focus correction value based on the error value, the focus correction value configured to reduce the error value to zero; and (f) readjusting the focus (via the autofocus device) to a distance which corresponds to the focus correction value.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The system discussed below implements an image recognition module (i.e., software code segments) to enable better first-time quality and accuracy in laser brazing applications. The system moreover allows for ease of use by an operator, reduces tune-in time for the laser braze processes, allows for process parameters to be shared between systems (i.e., via the internet) with minimal variation, and reduces facility downtime due to equipment damage (wire-feed tip bending/breakage). Image recognition is the process of identifying and detecting one or more objects in a digital image. Furthermore, image recognition has been used in many commercial and industrial applications such as, but not limited to, facial recognition within captured images, systems for factory automation, medical imaging, and surveillance. For instance, image recognition may be used to measure the distance between a focal point and an image capturing device. From this measured distance, adjustments to the positioning of image capturing device or some other feature in relation to the focal point may be conducted accordingly.

Figure 1:
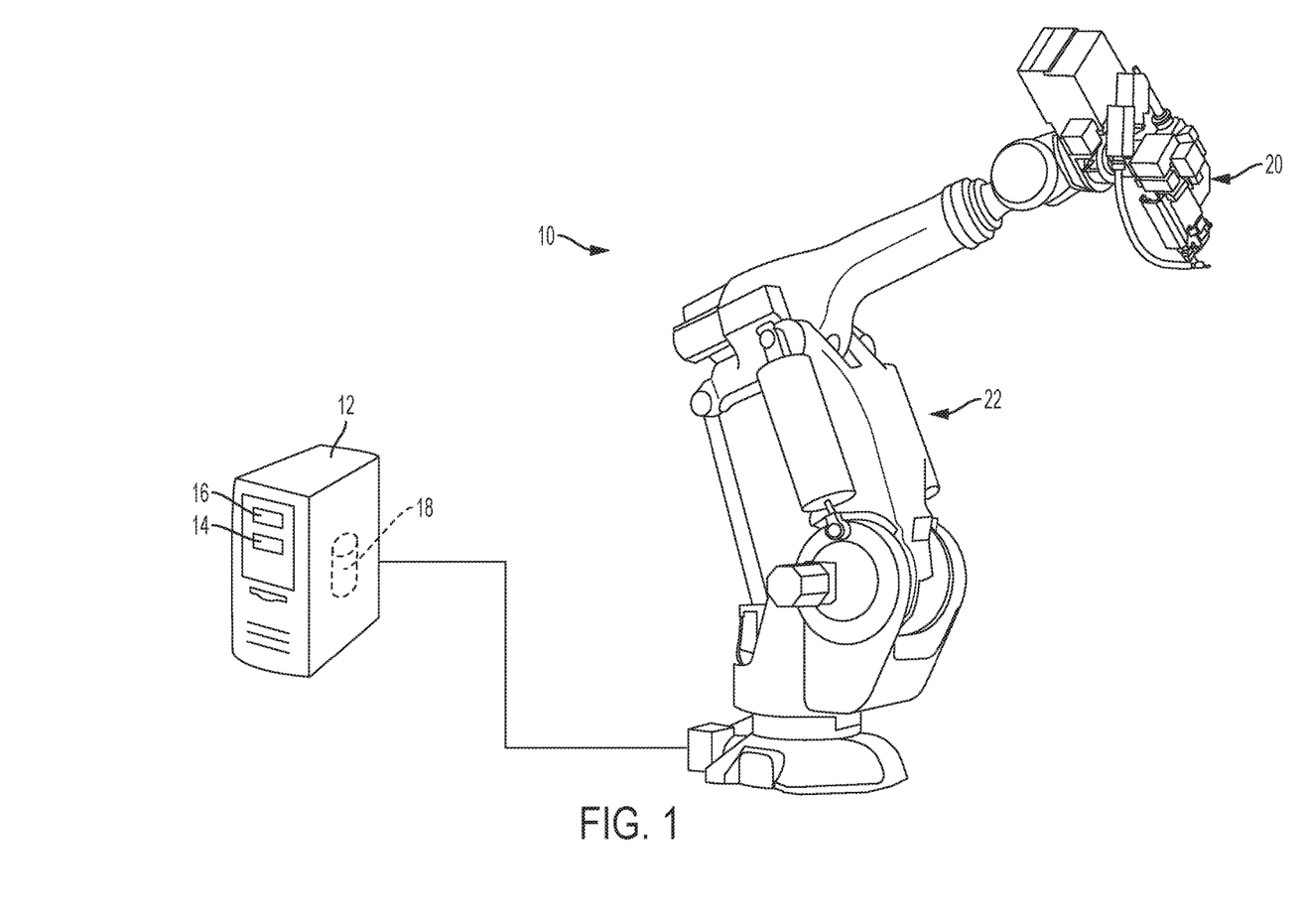
FIG. 1 discloses a perspective view of an exemplary embodiment of a system for object distance detection and positioning a brazing-welding device in relation thereto.

As shown in FIG. 1, an exemplary embodiment of a system for object distance detection and component positioning is generally designated by reference numeral 10. System 10 implements a computing device 12 having an installed image recognition module 14 and feed-back control loop module 16 installed therein via a database 18. A user (not shown) of system 10 moreover provides computing device 12 with one or more instructions to be directly or indirectly sent to image recognition module 14, feed-back control loop module 16, and a brazing-welding device 20 attached at the end of a remote robot 22. Furthermore, computing device 12 may be connected to a network (i.e., the internet) to upload/download movement instructions from one or more remote locations. The robot 22 may act as a pass through system communicatively linking computing device 12 to brazing-welding device 20. The one or more instructions may be properly provided to computing device 12 through one or more non-disclosed input and feedback devices such as, but not limited to, a keyboard, mouse, and monitor.

Figure 2:
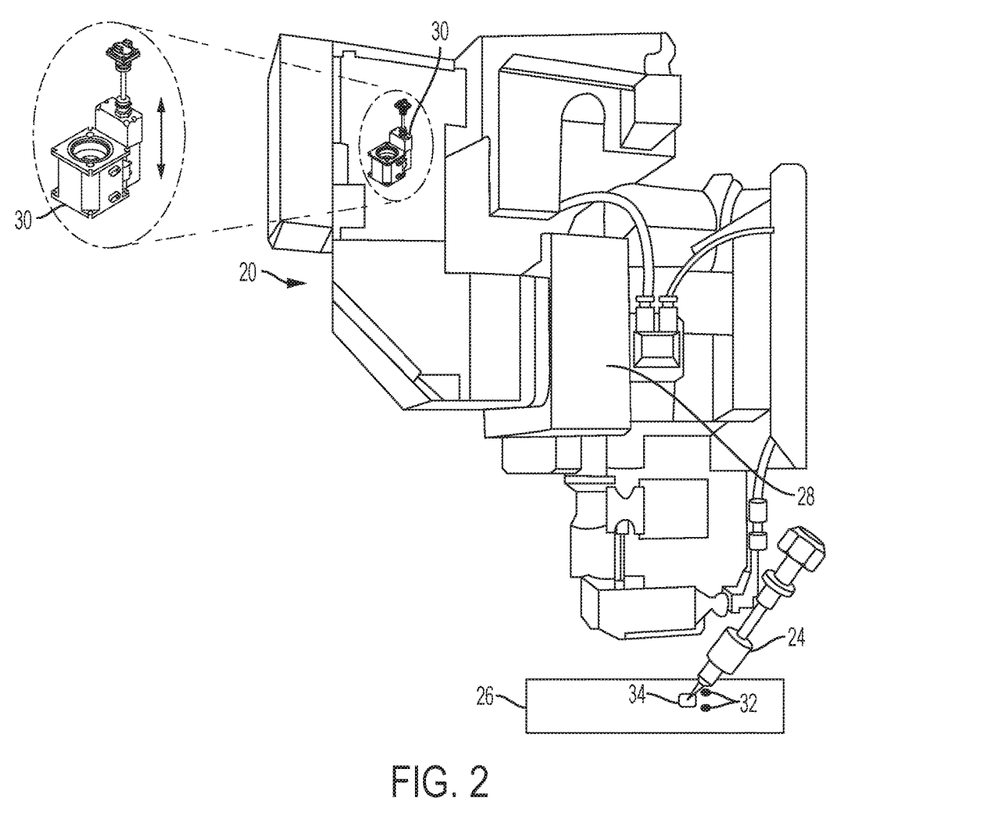
FIG. 2 shows the exemplary brazing-welding device in relation to the object, both of FIG. 1.

As shown in FIG. 2, the brazing-welding device 20 (e.g., SCANSONIC ALO3™) has a wire-feed tip 24 and is configured to focus on object 26 to either weld the object 26 (with another similar object) or braze the object 26 using an internal laser and wire-feed tip 24—as is generally known in the art. A monitoring system is incorporated into brazing-welding device 20 and includes a multifocal module 28, camera (not shown), and an actuator driven autofocus device 30. The multifocal module 28 (beam splitter) is positioned on the swivel axis of the brazing-welding device 20 and separates a generated laser beam (not shown) into three beams laid onto object 26 as sites, two substantially identical frontal designated sites 32 (precleaning spots) and a single main site 34 in the rear (weld/braze spot). The camera is a feedback device that senses object 26 and detects the locations of each site 32, 34 and subsequently sends a location image signal back to computing device 12. The motorized autofocus device 30 is configured to focus upon the displacement between the designated sites 32 by being adjusted to be closer and farther from object 26. As a result, when the focal distance from object 26 decreases, the frontal sites 26 will appear to a user to be moving away from the main site 34. The displacement between frontal sites 32 will also appear to increase such that designated sites 34 move away from each other. These sites 32, 34 may also be embodied as burn points etched unto the surface of object 26 through the laser beams from brazing-welding device 20. It should be understood that multifocal module 24 may split the internal laser beam into more or less than three beams (e.g., creating five sites).

Figure 3:
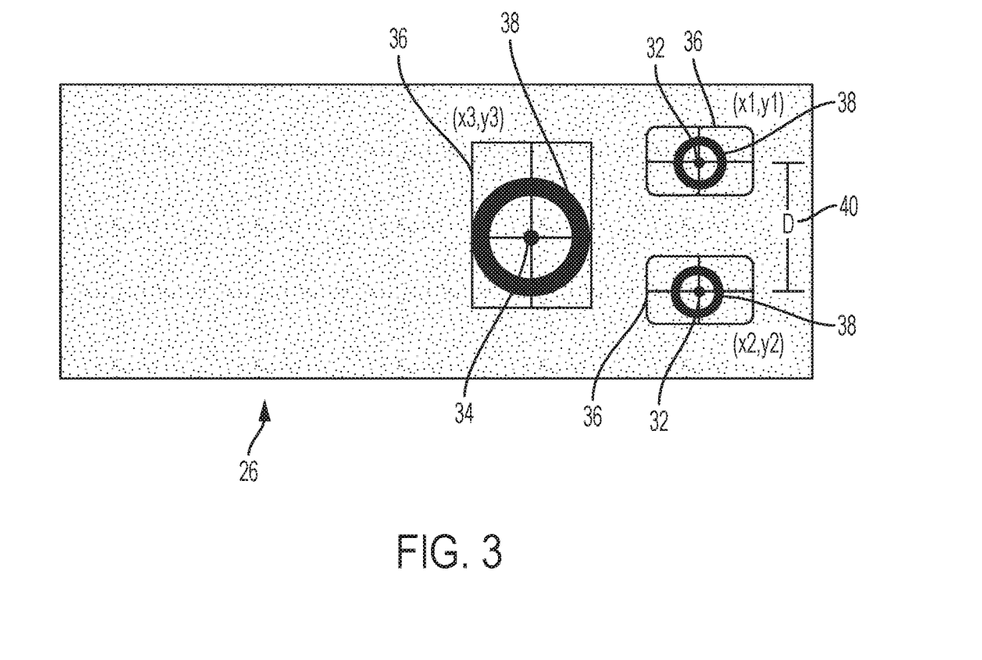
FIG. 3 shows an overhead camera view of the object as used in an exemplary embodiment of the system of FIG. 1.

As reflected in FIG. 3, image recognition module 14 (e.g., LESSMEULLER WELDEYE™) can implement a series of modular steps to calculate and determine the distance between the two designated sites 32 (actual distance). Image recognition module 14 can also compare the actual distance between the two designated sites 32 with a desired distance identified by the user of system 10. In addition, image recognition module 14 may adjust the focal points of autofocus device 30. In a first exemplary modular step, image recognition module 14 will position regions of interest 36 around the location of each site 32, 34. In a second exemplary modular step, image recognition module 14 will determine the pixel intensity 38 as a window within each region of interest 36 so as to detect the center coordinate value of each site 32, 34. Pixel intensity 36 may be determined through known blob detection and Circular Hough Transform techniques. Furthermore, in a third exemplary modular step, a center of mass equation can be used to determine the value of X axis coordinate value relative to the center of each pixel intensity One example of this equation may be as follows:

$$x_{cm} = \frac{\sum_{i}^{N} x_i I_i}{\sum_{i}^{N} I_i}$$

where $x_{cm}$ is the location of intensity center of mass and is shown as x1, and x2 (and x3 in certain instances) in FIG. 3; x is the pixel value (to provide direction of movement with the center of PIR Window being (0,0)), I is the pixel intensity (typically being between 0-255). An equivalent exemplary equation is used to determine the value of Y axis coordinate value relative to the center of each pixel intensity 38 (replacing the x variable with a y variable in the equation above). It should be understood that other generally known mathematical equations as well as image recognition methodologies may be implemented to determine the center of each pixel intensity 29.

Once each of (x1, y1) and (x2, y2) has been calculated, in a fourth exemplary modular step, the value of each pixel intensity window 38 is output in the image field of view of the image recognition module 14. In a fifth exemplary modular step, the distance 40 between the calculated coordinates of the designated sites is calculated and stored as the actual distance (e.g., to database 18). This may be conducted by converting the value of each pixel intensity window 38 to a distance displacement (e.g., in millimeters) through focal calibrations to autofocus device 30.

In a sixth exemplary modular step, the desired distance identified by the user of system 10 is received by image recognition module 14. In a seventh exemplary modular step, image recognition module 14 compares the calculated actual distance to this identified desired distance and then outputs that value as an error value. For example, if the desired distance is: x=24.3 mm, y=14.2 mm but the actual distance is: x=25.2 mm, y=14.6 mm, then there exists an error value of x=0.9 mm, y=0.4 mm. Otherwise, in another example, if the desired distance is the same as the actual distance (e.g., both being x=24.3 mm, y=14.2 mm), then the error value will be zero. It should be understood that the shown coordinates of x3, y3 may be considered the location of object 26 in which brazing is laid down/welding occurs. In an eighth exemplary modular step, an aspect of image recognition module 14 outputs the error value, which may be for correction purposes, to corresponding components of system 10. Skilled artisans can envision that a supportive flow representation of image recognition module 14 would produce a series of sequential process blocks from the start of module 14 until its completion.

In one embodiment of system 10, feedback control loop mechanism 16 (feedback mechanism/feedback control loop), for example a generally known PID controller, receives the error value between the actual distance and desired distance of the designated sites 32. Feedback mechanism 16 will then reduce the error value to zero to obtain a focus correction value which may be the ideal displacement of the sites that corresponds with the desired distance. This newly obtained focus correction value may then be output as an analog signal to autofocus device 30 via computing device 12. Autofocus device 30 will then adjust itself closer or farther from object 26 such that it reflects a corrected displacement distance corresponding to the focus correction value. PID controls are generally known in the art to reduce error rates such as the one discussed above.

Figure 4:
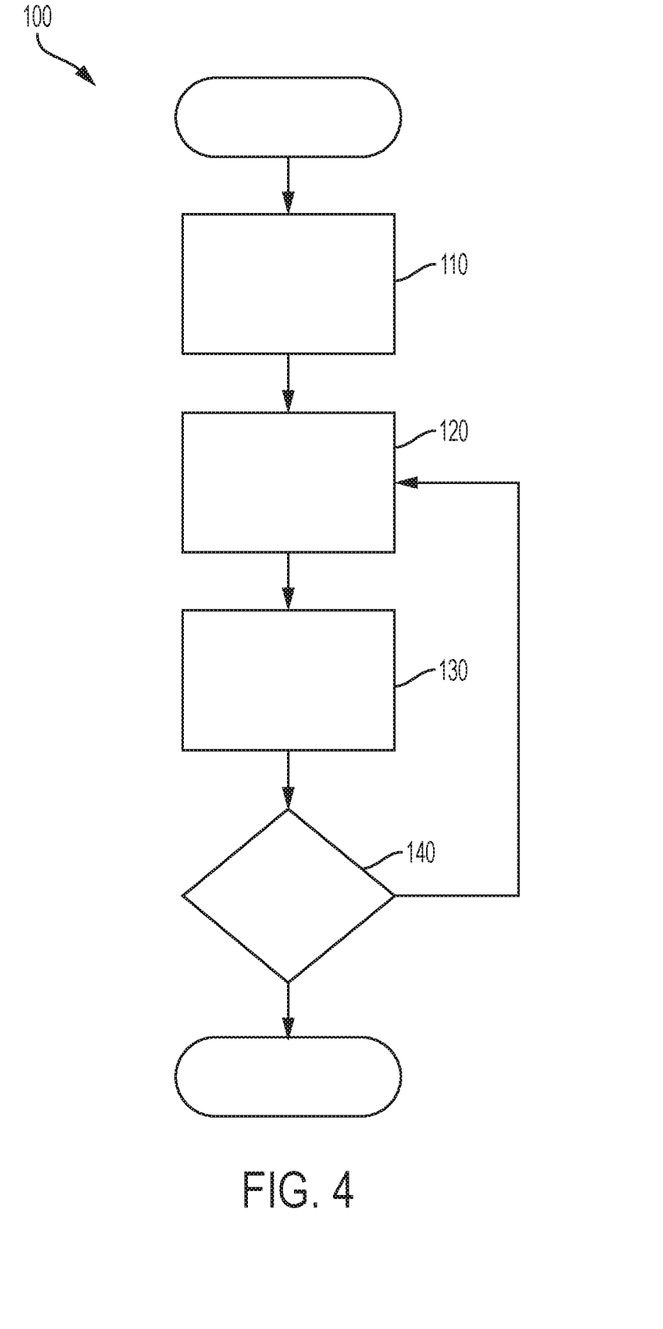
FIG. 4 shows an exemplary algorithmic flow of an exemplary image recognition module which is incorporated into an aspect of the system of FIG. 1.

With further reference to FIG. 4, there can be seen an exemplary flow of a method 100 to detect the distance of multiple sites 32, 34 and adjust the focus of an autofocus device 30 in relation to an identified displacement distance. One or more aspects of this method may be executed through the image recognition module 14, autofocus device 30, and/or computing device 12. In a first step 110, a user of computing device 12 will input and identify a desired distance between the sites 26 via computing device 12 (i.e., desired spot displacement). This may be done through the choice of a certain (x, y) coordinate for each designated site 32. The identified desired distance is also sent to image recognition module 14, in this or any of the following steps.

Monitoring system 24 then adjusts the focus distance of autofocus device 30 upon sites 26, and then monitors the distance between the designated sites 32, in step 120. The actual distances between sites 26 is calculated, in step 130, as discussed above. This may be done by image recognition module 14 being installed within either computing device 12 or (in certain embodiments) brazing-welding device 20. Image recognition module 14 will then determine if error exists between the identified desired distance and calculated actual distance, in step 140. Optionally, in this step, feedback mechanism 16 may receive the value of the existing error as well as the coordinates of the actual distance and produce a focus correction value. If there is a substantial discrepancy in the differences of these distances, then method 100 will repeat steps 120 through 140 until no substantial inconsistency exists between the identified and actual coordinate distances. It should be understood that the order of the above steps are only exemplary and other non-disclosed step orders, or the addition of non-disclosed steps, may be implemented without deviating from the scope of the method.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for object distance detection and focal positioning in relation thereto, for improved first-time quality and accuracy in laser brazing applications, the method comprising:

(a) identifying, via a computing device, a desired distance among a plurality of designated sites on an object;

(b) adjusting a focus, via an autofocus device, onto the plurality of designated sites;

(c) calculating, via an image recognition module, the actual distance among the plurality of designated sites, wherein the image recognition module will conduct at least the following steps to calculate the actual distance among the plurality of designated sites:

(i) positioning regions of interest around each of the plurality of designated sites;

(ii) determining a pixel intensity within each region of interest;

(iii) for each pixel intensity:

determining an X-axis coordinate value relative to the center of the pixel intensity, wherein the X-axis coordinate value is defined by the following equation:

$$x_{cm} = \frac{\sum_i^N x_i I_i}{\sum_i^N I_i}$$

and wherein $x_{cm}$ is an X-axis location of intensity center of mass, x is an X-axis pixel value, and/is an X-axis pixel intensity;

determining a Y-axis coordinate value relative to the center of the pixel intensity, wherein the Y-axis coordinate value is defined by the following equation:

$$x_{cm} = \frac{\sum_i^N x_i I_i}{\sum_i^N I_i}$$

and wherein $y_{cm}$ is a Y-axis location of intensity center of mass, y is a Y-axis pixel value, and/is a Y-axis pixel intensity; and wherein the X-axis and Y-axis coordinate values represent a center coordinate value; and (iv) determining the distance between the center coordinate values of each pixel intensity;

(d) determining, via the image recognition module, if error exist between the actual distance and the desired distance; and (e) wherein, in no particular order, repeating each of (b), (c), and (d) until no substantial error exists between the actual distance and the desired distance.

2. The method of claim 1, further comprising:

(f) providing the existing error value to a feedback control loop; and (g) producing, via the feedback control loop, a focus correction value.

3. The method of claim 1, further comprising an industrial robot acting as a pass through system between the computing device and the brazing-welding device.

4. The method of claim 1, wherein the feedback control loop is a PID controller located in the computing device.

5. The method of claim 1, wherein the autofocus device is located in a brazing-welding device.

6. The method of claim 1, wherein the image recognition module is located in the computing device.

7. A system to detect the distance of an object and position a motorized autofocus device in relation thereto, for improved first-time quality and accuracy in laser brazing applications, the system comprising:

a computing device configured to establish a desired distance among a plurality of designated sites on the object, the computing device further comprising an image recognition module configured to calculate the actual distance among the plurality of designated sites, wherein the image recognition module will conduct at least the following steps to calculate the actual distance among the plurality of designated sites:

(i) positioning regions of interest around each of the plurality of designated sites;

(ii) determining a pixel intensity within each region of interest;

(iii) for each pixel intensity:

determining an X-axis coordinate value relative to the center of the pixel intensity, wherein the X-axis coordinate value is defined by the following equation:

$$x_{cm} = \frac{\sum_{i}^{N} x_i I_i}{\sum_{i}^{N} I_i}$$

and wherein $x_{cm}$ is an X-axis location of intensity center of mass, x is an X-axis pixel value, and I is an X-axis pixel intensity;

determining a Y-axis coordinate value relative to the center of the pixel intensity, wherein the Y-axis coordinate value is defined by the following equation:

$$x_{cm} = \frac{\sum_{i}^{N} x_i I_i}{\sum_{i}^{N} I_i}$$

and wherein $y_{cm}$ is a Y-axis location of intensity center of mass, y is a Y-axis pixel value, and/is a Y-axis pixel intensity; and wherein the X-axis and Y-axis coordinate values represent a center coordinate value; and (iv) determining the distance between the center coordinate values of each pixel intensity, the image recognition module further configured to determine if error exists between the actual distance and desired distance of the plurality of designated sites;

the autofocus device configured to adjustably focus onto the plurality of designated sites;

wherein, the autofocus device will adjust the focus when error is determined to exist between the actual distance and desired distance of the plurality of designated sites.

8. The system of claim 7, further comprising:

a feedback control loop located in the computing device, the feedback control loop configured to produce a focus correction value; and wherein the focus correction value is configured to be sent to the autofocus device to adjust the focus to reduce error that exists between the actual distance and desired distance of the plurality of designated sites.

9. The system of claim 7, further comprising an industrial robot configured to be a pass through system between the computing device and the brazing-welding device.

10. The system of claim 7, wherein the feedback control loop is a PID controller.

11. The system of claim 7, wherein the autofocus device is located in a brazing-welding device having a multifocal module.

12. A method for detecting the distance among a plurality of designated sites on an object and positioning an autofocus device in relation to those designated sites, for improved first-time quality and accuracy in laser brazing applications, the method comprising:

(a) identifying, via a computing device, a desired distance among the plurality of designated sites on an object;

(b) adjusting a focus, via a motorized autofocus device of a brazing-welding device, to a focal distance that can monitor the plurality of designated sites, by moving the autofocus device closer to the object so as to decrease the focal distance or moving the autofocus device farther from the object so as to increase the focal distance;

(c) calculating, via an image recognition module, the actual distance among the plurality of designated sites, wherein the image recognition module will conduct at least the following steps to calculate the actual distance among the plurality of designated sites:

(i) positioning regions of interest around each of the plurality of designated sites;

(ii) determining a pixel intensity within each region of interest;

(iii) for each pixel intensity:

determining an X-axis coordinate value relative to the center of the pixel intensity, wherein the X-axis coordinate value is defined by the following equation:

$$x_{cm} = \frac{\sum_{i}^{N} x_i I_i}{\sum_{i}^{N} I_i}$$

and wherein $x_{cm}$ is an X-axis location of intensity center of mass, x is an X-axis pixel value, and I is an X-axis pixel intensity;

determining a Y-axis coordinate value relative to the center of the pixel intensity, wherein the Y-axis coordinate value is defined by the following equation:

$$x_{cm} = \frac{\sum_{i}^{N} x_i I_i}{\sum_{i}^{N} I_i}$$

and wherein $y_{cm}$ is a Y-axis location of intensity center of mass, y is a Y-axis pixel value, and/is a Y-axis pixel intensity; and wherein the X-axis and Y-axis coordinate values represent a center coordinate value; and (iv) determining the distance between the center coordinate values of each pixel intensity;

(d) calculating, via the image recognition module, an error value which corresponds to a discrepancy between the actual distance and the desired distance;

(e) calculating, via a feedback control loop, a focus correction value based on the error value, the focus correction value configured to reduce the error value to zero; and (f) readjusting the focus, via the autofocus device, to a distance which corresponds to the focus correction value.

13. The method of claim 12, further comprising an industrial robot acting as a pass through system between the computing device and the brazing-welding device.

14. The method of claim 12, wherein the feedback control loop is a PID controller located in the computing device.

15. The method of claim 12, wherein the brazing-welding device comprises a multifocal module.

16. The method of claim 12, wherein the image recognition module is located in the computing device.

* * * * *